United States Patent [19]

Wheeler

[11] 4,145,057

[45] Mar. 20, 1979

[54] PACKING MEMBER

[75] Inventor: John H. Wheeler, Dallas, Tex.

[73] Assignee: The Texacone Company, Dallas, Tex.

[21] Appl. No.: 855,154

[22] Filed: Nov. 28, 1977

[51] Int. Cl.$^2$ .................... F16J 15/32; F16J 15/40
[52] U.S. Cl. ................................ 277/27; 277/75;
277/153; 277/205; 277/215
[58] Field of Search ............ 277/152, 153, 75, 76,
277/3, 27, 215, 205, 212 R, 212 F

[56] References Cited

U.S. PATENT DOCUMENTS

| 2,370,913 | 3/1945 | Procter | 277/153 X |
| 2,523,604 | 9/1950 | Vedovell | 277/153 |
| 2,867,457 | 1/1959 | Riesing et al. | 277/153 |
| 3,188,098 | 6/1965 | Skinner | 277/205 X |
| 3,390,890 | 7/1968 | Kurtz | 277/205 |
| 3,443,814 | 5/1969 | Dahlheimer | 277/27 |
| 3,527,507 | 9/1970 | Clark et al. | 277/205 X |
| 3,627,335 | 12/1971 | Wheeler | 277/205 |
| 3,861,691 | 1/1975 | Wheeler | 277/205 X |
| 3,885,802 | 5/1975 | Wheeler | 277/212 R |
| 3,913,460 | 10/1975 | Wright | 277/205 X |
| 4,053,166 | 12/1975 | Domkowski | 277/152 |

FOREIGN PATENT DOCUMENTS

| 2210209 | 11/1973 | Fed. Rep. of Germany | 277/75 |
| 1371175 | 7/1964 | France | 277/153 |
| 1057629 | 2/1967 | United Kingdom | 277/153 |
| 1282968 | 7/1972 | United Kingdom | 277/153 |

Primary Examiner—Robert S. Ward, Jr.
Attorney, Agent, or Firm—Richards, Harris & Medlock

[57] ABSTRACT

A packing member comprising an annular body having a circular groove extending axially thereinto through an end wall to form inner and outer sealing lips utilizes a resilient member embedded in the annular body to exert a radially directed force to a wall surface of the groove to actuate one of the sealing lips. The other sealing lip has a plurality of spaced-apart circular holes extending axially thereinto through the first end wall of the body. In one embodiment, the resilient member is a garter spring carried in a recess formed in the inner wall surface of the groove to actuate the inner sealing lip. In another embodiment, the resilient member is a curved solid rod carried in a recess formed in the outer wall surface of the groove to actuate the outer sealing lip.

10 Claims, 6 Drawing Figures

PACKING MEMBER

BACKGROUND OF THE INVENTION

This invention relates to sealing devices; and more particularly, it relates to a packing member for forming a seal between the inner wall of an opening and the outer surface of a member extending therethrough.

It has heretofore been common practice to form a seal between the wall of an opening and a shaft or other cylindrical member extending therethrough by positioning a packing member between the wall of the opening and outer surface of the member.

Typically, packing members are annular bodies integrally formed from an elastic material such as rubber or plastic. Packing members generally have a V-shaped or truncated V-shaped cross section. Packing members may also have a plurality of holes formed therein which extend axially into the member from equally spaced points along a circle extending around an end wall of the member.

In addition to the above basic packing members, various other fluid-sealing devices in the prior art have an annular body, and further comprise a garter spring. Sealing devices of this type have located the garter spring in a continuous groove formed in one end of the annular body by mere insertion of the spring into the groove between the inner and outer wall surfaces of the groove and against the bottom of the groove.

SUMMARY OF THE INVENTION

In accordance with the present invention, a packing member suitable for forming a seal between the inside surface of a bore and a shaft extending therethrough includes an annular body having by a circular outer wall and a circular inner wall, with first and second end walls extending between the inner and outer walls. The annular body has a circular groove in the first end wall, defining inner and outer sealing lips. A resilient, circular member is embedded in the annular body, with the member applying a radially directed force to one of the sealing lips.

The circular groove in the annular body further defines inner and outer wall surfaces. The inner wall surface is displaced radially outward from the inner wall of the body, and the outer wall surface is displaced radially inward from the outer wall of the body. The wall surface of the groove associated with the sealing lip that is actuated by the resilient member has a recess formed therein for receiving the resilient member. The recess is disposed substantially parallel to the bottom of the groove in the annular body intermediate the top of the wall surface and the bottom of the groove.

In one embodiment, the resilient member is a garter spring carried in a recess in the inner wall surface of the circular groove to actuate the inner sealing lip. In another embodiment, the resilient member is a curved solid rod carried in a recess in the outer wall surface of the circular groove to actuate the outer sealing lip.

DESCRIPTION OF THE DRAWINGS

A more complete understanding of the invention may be had by referring to the following Detailed Description when taken in conjunction with the Drawings, wherein.

DETAILED DESCRIPTION

Figure 1:
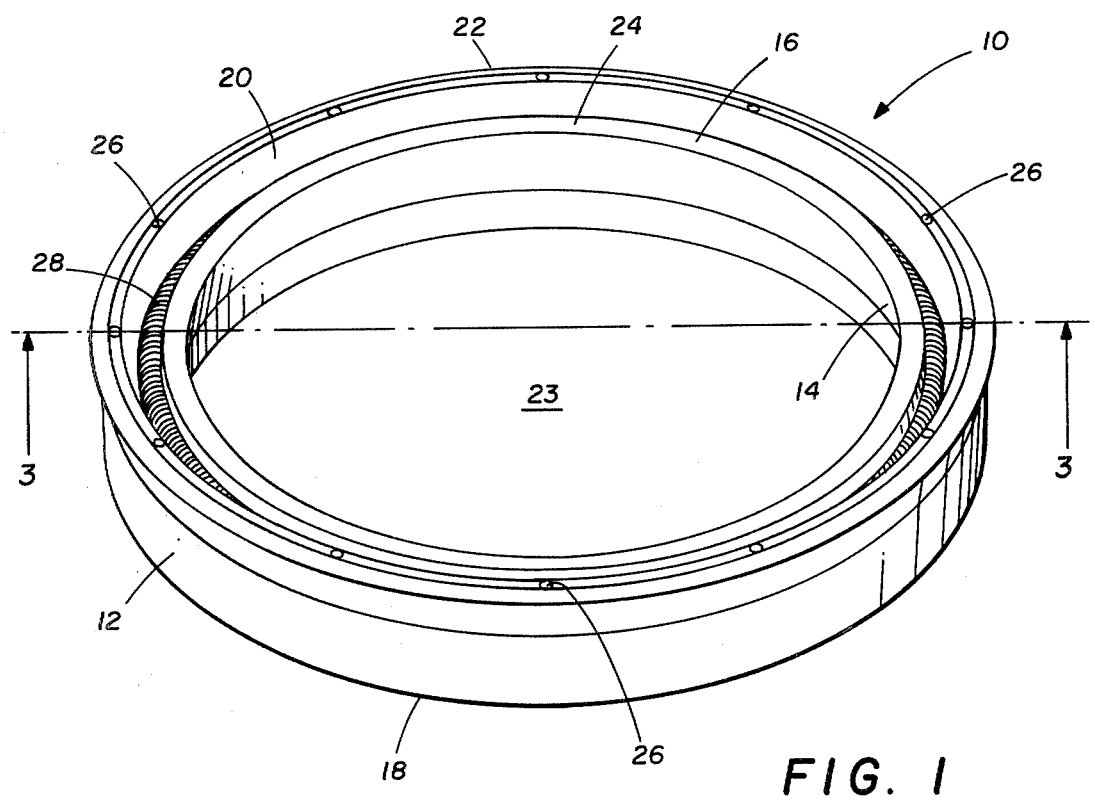
FIG. 1 is a perspective view of one embodiment of a packing member in accordance with the present invention.

Referring now to the Drawings, and particularly to FIG. 1 thereof, one embodiment of a packing member 10 in accordance with the present invention is shown. Packing member 10 comprises an annular body having a circular outer wall 12 and a circular inner wall 14 that defines circular opening 23. The annular body further includes first and second end walls 16 and 18, respectively, extending between the inner and outer walls 12 and 14.

As shown in FIG. 1, the first end wall 16 has a groove 20 formed therein defining an outer sealing lip 22 and an inner sealing lip 24. Packing member 10 is also provided with a plurality of openings 26, shown as circular holes, extending axially into the annular body of packing member 10 from equally spaced points along a circle extending around the top surface of outer sealing lip 22.

Figure 2:
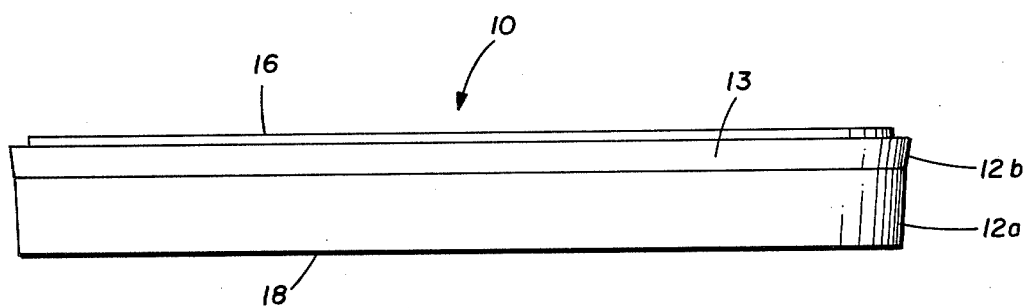
FIG. 2 is a side view of the packing member shown in FIG. 1.

Referring now to FIG. 2, the side view of packing member 10 illustrates that outer wall 12 flares outwardly near end 16 to define a lower portion 12a and an upper portion 12b. The dividing line between the two portions where wall 12 begins to flare is shown by a transition line 13 extending around the annular body of member 10 between the first and second end surfaces 16 and 18. The portion 12a of wall 12 extends from end wall 18 toward wall 16 at an orientation that is substantially perpendicular to the flat surface of end wall 18. Wall portion 12b of outer wall 12, however, diverges outwardly from the transition line 13 to form the flared configuration for packing member 10.

Figure 3:
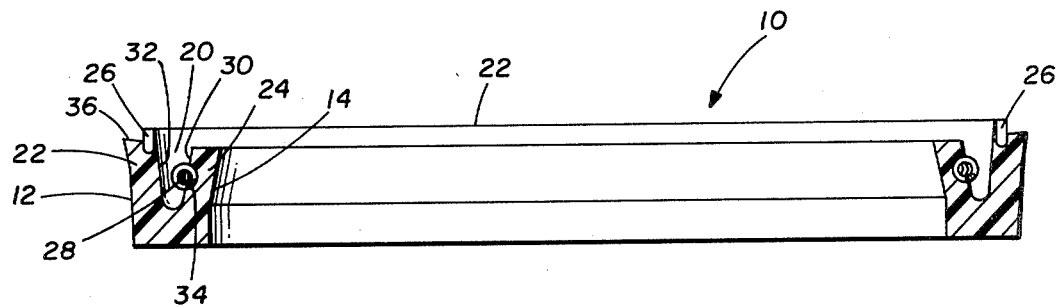
FIG. 3 is a section view of the packing member taken along a line 3—3 in FIG. 1.

With reference now to FIG. 3, it may be seen that packing member 10 further includes a resilient, circular member 28 embedded in the annular body. Also, it may be seen that groove 20 defines an inner wall surface 30 displaced radially outward from inner wall 14, which surface has a recess 34 formed therein for receiving resilient member 28. Groove 20 also defines an outer wall surface 32 displaced radially inward from outer wall 12.

The recess 34 in inner wall surface 30 is disposed at a location intermediate the top surface of inner sealing lip 24 and the bottom of groove 20, and extends around the annular body substantially parallel to the bottom of groove 20. Recess 34 is shaped in a semicircle to conform to the outside surface configuration of resilient member 28, which is shown as a garter spring.

Garter spring 28 applies an inward, radially directed force to the inner wall surface 30 of groove 20. The radially directed inward force urges inner wall 14 into sealing engagement with a shaft or other cylindrical member inserted within opening 23 that is to be sealed against the passage of fluid therearound.

It will be appreciated that garter spring 28 actuates the inner sealing lip 24 to form the sealing relationship with the member inserted through opening 23, whereas outer sealing lip 22 will serve to form a seal around the wall of an annulus. It will further be observed that outer sealing lip 22 includes a small notch 36 at the outside peripheral edge thereof to permit fluid acting on end wall 16 to be utilized to actuate the outside sealing lip 22 into its sealing engagement with the annulus wall.

Figure 4:
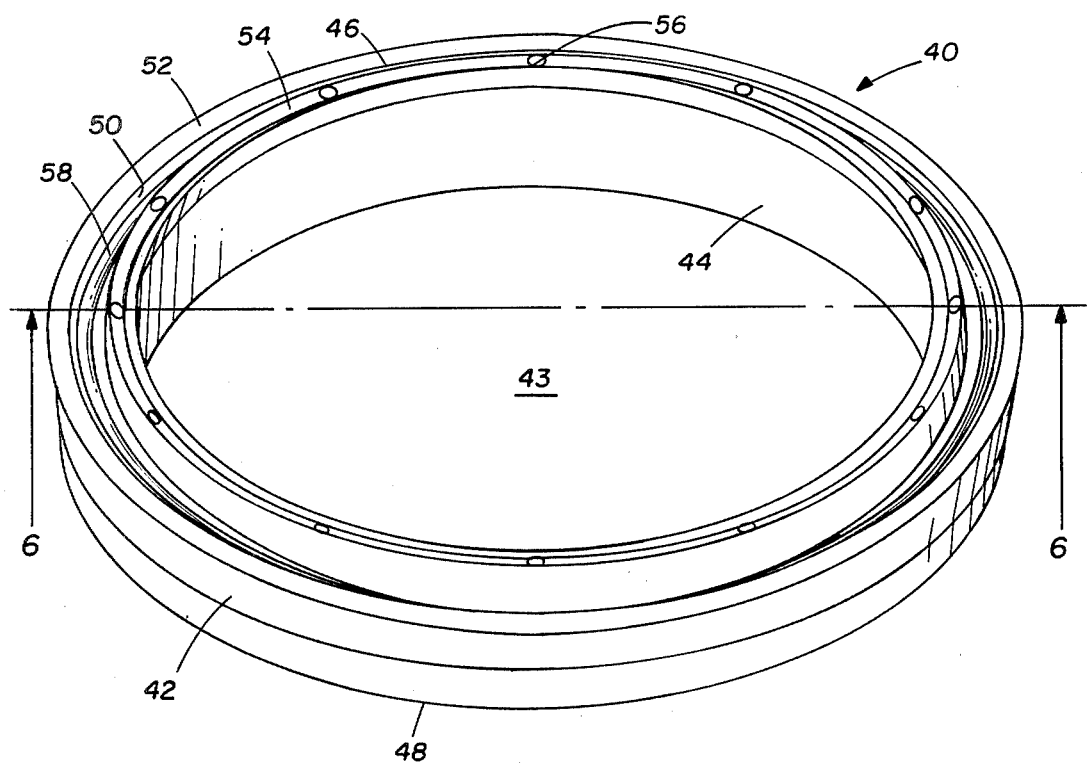
FIG. 4 is a perspective view of another embodiment of a packing member in accordance with the present invention.
Figure 6:
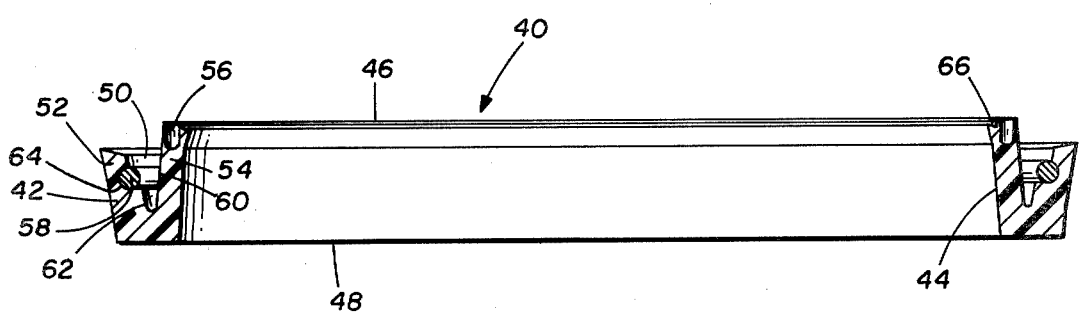
FIG. 6 is a section view of the packing member shown in FIG. 4 taken along a line 6—6.
Figure 5:
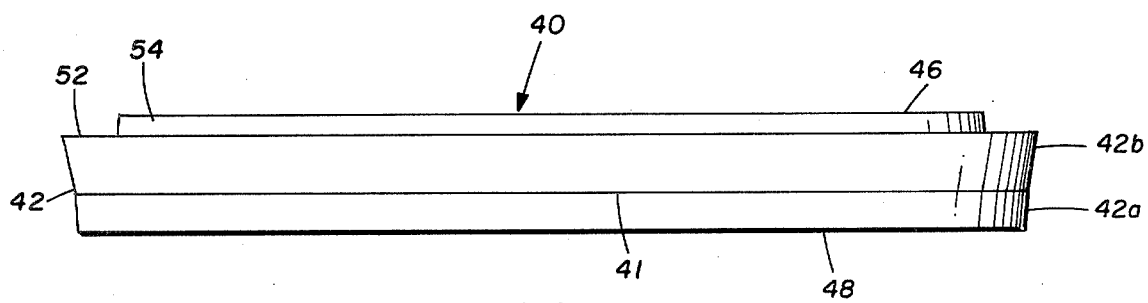
FIG. 5 is a side view of the packing member shown in FIG. 4.

Referring next to drawing FIGS. 4-6, and particularly to FIG. 4, another embodiment of a packing member 40 in accordance with the present invention is shown. Packing member 40 comprises an annular body having a circular outer wall 42 and a circular inner wall 44 that defines circular opening 43. The annular body further includes first and second end walls 46 and 48, respectively, extending between the inner and outer walls 42 and 44.

As shown in FIG. 4, the first end wall 46 has a groove 50 formed therein defining an outer sealing lip 52 and an inner sealing lip 54. Packing member 49 is also provided with a plurality of openings 56, shown as circular holes, extending axially into the annular body of packing member 40 from equally spaced points along a circle extending around the top surface of inner sealing lip 54.

Referring now to FIG. 5, the side view of packing member 40 illustrates that outer wall 42 flairs outwardly near end 46 to define a lower portion 42a and an upper portion 42b. The dividing line between the two portions where wall 42 begins to flair is shown by a ridge line 41 extending around the annular body of member 40 between the first and second end surfaces 46 and 48.

From the view in FIG. 5, it will be appreciated that in the embodiment of FIGS. 4-6, inner sealing lip 54 extends to a vertical height greater than that of outer sealing lip 52. It will be appreciated from reference back to FIG. 3 of the Drawings that, in the embodiment shown therein, the outer sealing lip 22 extends to a vertical height greater than that of the inner sealing lip 24 which has the resilient member 28 acting thereon.

With reference now to FIG. 6, it may be seen that packing member 40 includes a resilient, circular member 58 embedded in the annular body. In this embodiment, the resilient circular member actuates outer sealing lip 52. Also in this embodiment, groove 50 defines an inner wall surface 60 displaced radially outward from inner wall 44. Groove 50 also defines an outer wall surface 62 displaced radially inward from outer wall 42, which wall surface has a recess 64 formed therein for receiving resilient member 58.

The recess 64 in outer wall surface 62 is disposed at a location intermediate the top surface of outer sealing lip 52 and the bottom of groove 50. Recess 64 is shaped in a semicircle to conform to the outside surface and configuration of resilient member 58, which is shown as a curved solid rod.

Resilient member 58 applies an outward, radially directed force to the outer wall surface 62 of groove 50. The radially directed outward force urges outer wall 42 into sealing engagement with an annulus opening into which the packing member is inserted.

Inner sealing lip 54 serves to form a seal around a member inserted through opening 43. It will be further observed that inner sealing lip 54 includes a small notch 66 formed at the inside peripheral edge of lip 54 to permit fluid acting on end wall 46 to be utilized to actuate the inner sealing lip 54 into a sealing engagement with a cylindrical member inserted through opening 43.

From the foregoing, it will be understood that whereas prior art packing members have utilized garter springs disposed in continuous grooves, the packing member of the present invention has a resilient member embedded in a wall surface of the groove, with the member applying a force on the wall surface of the groove to actuate a sealing lip defined by the groove.

Although preferred embodiments of the invention have been illustrated in the accompanying Drawings and described in the foregoing Detailed Description, it will be understood that the invention is not limited to the embodiments disclosed, but is capable of numerous modifications without departing from the scope of the invention.

What is claimed is:

1. A packing member comprising:
   an annular body having a circular outer wall and a circular inner wall, with first and second end walls extending between the inner and outer walls;
   said annular body having a groove with inner and outer groove walls extending axially into the body through the first end wall;
   the inner and outer walls of said body including inner and outer sealing lips, respectively, formed therein adjacent to at least a portion of the groove; and
   a resilient, circular member engaging one of the groove walls for applying a radially directed force to one of the sealing lips;
   said annular body including a plurality of spaced apart openings extending axially into the first end wall thereof between the other groove wall and the other sealing lip.

2. The packing member of claim 1 wherein the wall of the groove engaged by said resilient member has a recess formed therein for receiving the resilient member.

3. The packing member of claim 2 wherein the recess is disposed in the inner groove wall substantially adjacent to the inner sealing lip.

4. The packing member of claim 2 wherein the recess is disposed in the outer groove wall substantially adjacent to the outer sealing lip.

5. The packing member of claim 2 wherein the resilient member is a garter spring.

6. The packing member of claim 4 wherein the resilient member is a curved solid rod.

7. A packing member comprising:
   an annular body having a circular outer wall and a circular inner wall, with first and second end walls extending between the inner and outer walls;
   said annular body having a circular groove extending axially into the body through the first end wall to provide inner and outer sealing lips for the inner and outer walls of the body, the groove defining inner and outer groove wall surfaces displaced radially outward from the inner wall of the annular body with one of the groove wall surfaces having a recess formed therein; and
   a resilient, circular member carried in the recess formed in said one groove wall surface for applying a radially directed force to actuate the sealing lip associated with the said one groove wall surface;
   said annular body including a plurality of spaced apart openings extending axially into the first end wall between the other groove wall surface and the other sealing lip associated with the said other groove wall surface.

8. The packing member of claim 7 wherein the recess is formed in the inner groove wall surface, and wherein the resilient, circular member is a garter spring.

9. The packing member of claim 7 wherein the recess is formed in the outer wall surface of the groove, and the resilient member is a curved solid rod.

10. The packing member of claim 7 wherein the recess formed in the one groove wall surface is disposed in a substantially parallel relation with the bottom of the groove in the annular body.

* * * * *